United States Patent [19]

Roberts

[11] 4,293,799

[45] Oct. 6, 1981

[54] POWER SUPPLY SYSTEMS

[75] Inventor: Frank B. Roberts, Gateshead, England

[73] Assignee: Victor Products (Wallsend) Limited, Wallsend, England

[21] Appl. No.: 95,384

[22] Filed: Nov. 19, 1979

[30] Foreign Application Priority Data

Oct. 5, 1979 [GB] United Kingdom ............... 34722/79

[51] Int. Cl.³ ............................................ H05B 41/24
[52] U.S. Cl. ..................................... 315/256; 307/33; 315/220; 315/223; 315/231; 315/247; 315/281; 315/324
[58] Field of Search ............... 315/186, 189, 210, 219, 315/220, 223, 224, 231, 239, 247, 256, 277, 279, 281, 297, 324, DIG. 7, 787, 244; 323/4, 6; 307/17, 33, 36

[56] References Cited

U.S. PATENT DOCUMENTS

| 2,011,929 | 8/1935 | Cramp et al. | 315/281 X |
| 2,066,549 | 1/1937 | Tilles | 315/256 |
| 2,610,310 | 9/1952 | Miles | 315/256 X |
| 2,683,241 | 7/1954 | Passmore | 315/256 X |
| 3,743,921 | 7/1973 | Legg et al. | 323/4 |
| 4,127,798 | 11/1978 | Anderson | 315/239 X |

Primary Examiner—Eugene R. La Roche
Attorney, Agent, or Firm—Kemon & Estabrook

[57]    ABSTRACT

A power supply system for operating fluorescent lamps in a hazardous atmosphere comprises a 1 kHz to 500 kHz constant current power supply which feeds primary windings of transformers which are connected together in series. Fluorescent lamps are connected across the transformer secondary windings. A voltage control circuit is connected to the supply supply output to ensure that the amount of electrical energy supplied to the transformers cannot ignite the atmosphere under any normal or fault condition. Capacitors are connected in series with the transformer primary windings to reduce the circuit reactance so that, for a given level of supply voltage, an increased number of lamps can be fed with starting voltage. Due to the substantially constant current which is fed through the transformer primary windings, the situation cannot occur that the firing of one lamp prevents the others from firing. The transformers preferably include windings to feed heaters of the lamps. The lamps may be disconnected from the supply by removal of the transformer cores or by separation of the windings.

9 Claims, 4 Drawing Figures

POWER SUPPLY SYSTEMS

This invention relates to electric power supply systems for use in mines and other locations in which hazardous atmospheres containing flammable mixtures of gases, vapours and/or dusts can occur.

Fluorescent lamps provide a very convenient light source for illuminating the working areas at the coal face and elsewhere in a mine, but any electrical apparatus which is used in such hazardous atmospheres must be so designed that the gases, etc. cannot be ignited outside the apparatus by sparks or high temperatures caused by either normal or faulty operation of the apparatus. One design concept which conforms with this requirement is that of "intrinsic safety". The apparatus is designed to operate at such low energy levels that any sparks which may occur will have insufficient energy to ignite the gases etc. and dangerously high temperatures are not encountered.

In order to operate a fluorescent lamp satisfactorily, a sufficiently high initial voltage must be applied to the lamp to cause it to strike. If the current be limited to a predetermined safe level, the voltage across the lamp will then decrease to the normal running voltage of the lamp. Under both striking and running conditions, the circuit must be intrinsically safe.

The circuit must operate safely even if the lamp is broken or removed, and no component or combination of components in the lamp control circuits can be allowed to store more than a given amount of energy.

In previous fluorescent lighting systems for use in mines we have provided intrinsically safe supply units at intervals along the coal face, each unit supplying a number of lamps located on respective chocks (i.e. the props supporting the roof immediately in front of the coal face).

Each of the intrinsically safe supply units has comprised an oscillator and amplifier feeding a number of tuned circuits, to provide a high frequency alternating supply in the region of 30 kHz. Our British Pat. No. 1,401,628 describes such a supply unit.

Because the capacitance of each lamp-connecting cable limited its useful length, the effective use of each supply unit was limited to supplying a small number of lamps, for example five.

Each unit has had to be supplied with electrical power from a lighting transformer, usually positioned at the main gate end of the coal face. A standard lighting transformer could have an output of 2½ kVA at 125 V 50 Hz. Such a supply is not intrinsically safe.

The cables feeding this voltage along the working face to the various lamp supply units are therefore potentially extremely dangerous, and are often so sited that they are vulnerable to crushing or severing.

It would be possible, for some lengths of coal face, to site the intrinsically safe supply units at the lighting transformer and to run only cables which carry an intrinsically safe supply along the coal face. Then if any of the cables suffered damage an explosion would not result.

It is an object of the present invention to provide an improved electrical supply system suitable, for operating a plurality of fluorescent lamps in a potentially hazardous atmosphere.

According to the invention, a power supply system for supplying electrical power to a plurality of fluorescent lamps in a potentially hazardous atmosphere comprises a power supply which produces a substantially constant current output at a frequency in a range of about 1 kHz to about 500 kHz; a plurality of transformers each having a primary winding and a secondary winding; means to couple said primary windings of all of said transformers together in a series circuit; means to couple at least one repective fluorescent lamp across each said transformer secondary winding; voltage control means connected between said power supply and said series circuit to control the voltage level applied to said series circuit by said power supply to ensure that the amount of electrical energy supplied to said transformer primary windings by said power supply cannot be incendive to the atmosphere; and capacitance means coupled in said series circuit to reduce the reactance of said series circuit whereby an increased number of said lamps can be started for a given value of said applied voltage level.

Embodiments of the invention will now be described, by way of example, with reference to the accompanying drawings, in which.

Figure 1:
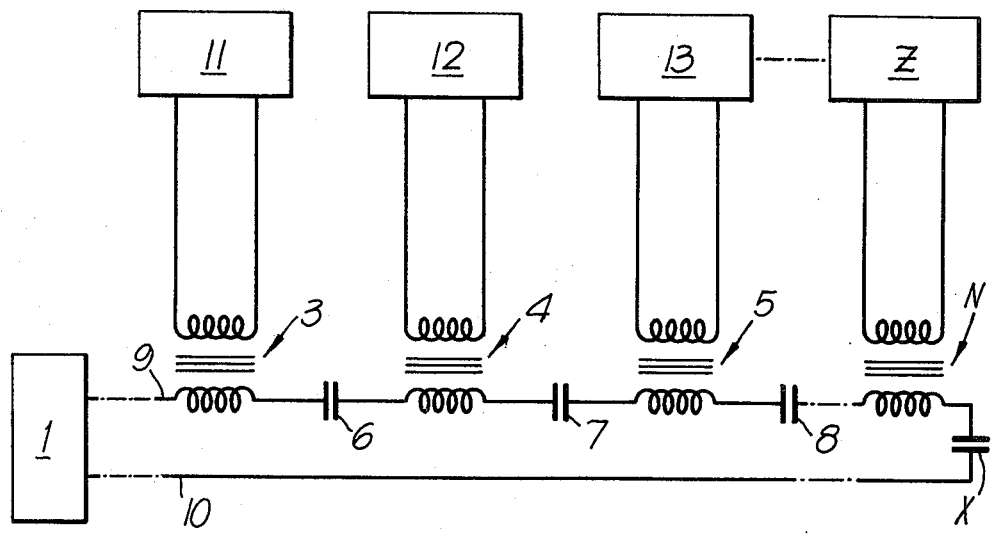
FIG. 1 is a schematic diagram of one form of power supply system in accordance with the invention.

Referring to FIG. 1 of the drawings, a power supply unit 1 may comprise an oscillator operating at a relatively high frequency (e.g. in the 1 kHz to 100 kHz range) as disclosed in our patent specification No. 1,401,628, or at an even higher frequency up to, say, 500 kHz. The essential feature is that the power source must produce a substantially constant amplitude alternating current or substantially constant amplitude current pulses.

The primary windings of a plurality of transformers 3, 4, 5 - - - N are interconnected in series with respective capacitors 6, 7, 8 - - - X and the series circuit thus formed is connected to the unit 1 by lines 9 and 10.

The secondary windings of the transformers are connected to respective loads 11, 12, 13 - - - Z each comprising, for example, at least one fluorescent lamp.

In an exemplary arrangement, a coal face might be 100 yards long, with 80 chocks distributed along its length. A 9 inch fluorescent lamp fitting could be fixed to every alternate chock. Five lamps might be fed from a single power supply unit and associated transformer string. Hence, eight power supply units would be located at the main gate, with eight cables extending successively longer distances across the face to feed their respective group of lamps.

Each of these eight cables would be carrying an intrinsically safe supply. There would be no cables associated with lighting, and extending anywhere across the face, which would be carrying an unsafe supply.

Figure 2:
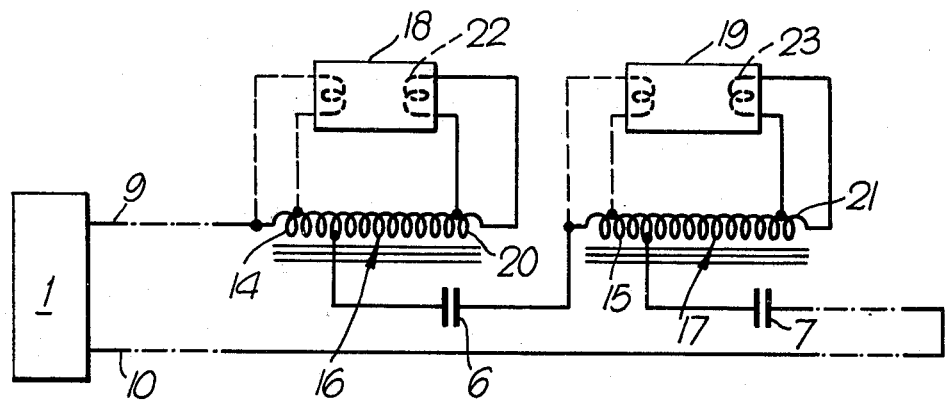
FIG. 2 is a schematic diagram of a modified form of the system of FIG. 1.

Referring to FIG. 2 of the drawings, in an alternative supply system the supply unit 1 feeds a transformer string in a similar manner to the FIG. 1 system, but in this case the transformers are auto-transformers. Primary sections 14, 15 etc. are connected in series with capacitors 6, 7 etc. across the unit 1. The complete windings 16, 17 etc. supply the starting and running voltages for fluorescent tubes 18, 19 etc., whilst a section 20, 21 etc., comprising a few turns at the end of each winding, supplies a tube heater 22, 23 etc. If necessary, a second heater (shown in dotted lines) may be provided at the opposite end of the tube, and this heater can be fed from a section at the opposite end of the winding.

Tubes of different lengths requiring differing voltages and currents can be readily accommodated by employing different transformer windings, or alternatively by using transformers having the same windings and cores, by merely changing the core gap, thereby changing the coupling between the winding sections.

It can be arranged for the secondary winding to be separable from the primary winding taking with it part or all of the core. This will have little or no effect on the other loads in the system. This then amounts to a non-sparking means for disconnecting the load. Furthermore, removal of the core alone would act as a switch, and would be a desirable means for connection or switching in situations where, because of power levels, intrinsic safety could not be achieved.

The frequencies used for the intrinsically safe application are such that the transformers of FIGS. 1 and 2 can be quite small, and the windings may be conveniently wound on bobbins and housed in standard ferrite pot cores.

Figure 3:
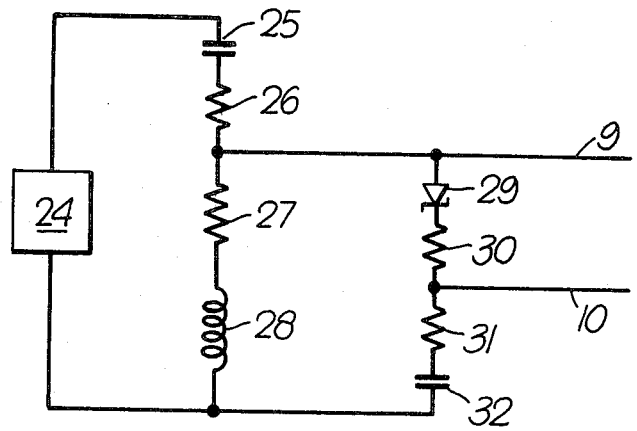
FIG. 3 is a circuit diagram of a power supply unit for use in the systems of FIGS. 1 and 2.

A suitable circuit for use in the power supply unit 1 is shown schematically in FIG. 3. An oscillator/amplifier unit 24 provides a regulated a.c. voltage at a frequency of, say, 90 kHz. This voltage is fed to a circuit comprising a capacitor 25, resistors 26 and 27, and an inductor 28, which circuit is tuned or approximately tuned to the supply frequency. Across the resistor 27 and the inductor 28 is connected a series circuit comprising a zener diode 29, resistors 30 and 31 and a capacitor 32. The capacitor 32 and inductor 28 also form a circuit which is tuned or approximately tuned at 90 kHz. The output of the circuit to the lines 9 and 10 is taken off across the diode 29 and the resistor 30.

The resistors 26, 27 and 31 act as transient absorbers. The output current level can be monitored by monitoring the voltage across the resistor 31.

The zener diode 29 is typically an 80 volt zener, but the resistor 30 ensures that the output does not suddenly cut off at 80 volts. When the output exceeds 80 volts, for example due to connecting too many transformers and lamps to the lines 9 and 10, part of the output current passes through the diode 29 and resistor 30, and is not fed along the lines. Hence the voltage drop across the resistor 30 is added to the voltage across the diode. In effect, the output voltage is limited at approximately 120 volts peak, but at voltages between 80 and 120 the power delivered to the load progressively decreases. This ensures that the total energy fed to the lines 9 and 10 cannot become incendive to the hazardous atmosphere.

Instead of using a tuned circuit as the constant current source, means could be provided for monitoring the output of the supply unit 1, the output voltage of the source being adjusted by a regulator in response to any change in the monitored current, to maintain control of that current.

In a mine, the power supply unit 1 of the above embodiments would receive power from a 125 volt lighting transformer, the supply from which would not be intrinsically safe. The unit 1 would therefore have to be contained in a flameproof enclosure. However, the unit could be quite small, and could in some cases be housed within the flameproof enclosure of the lighting transformer itself.

Figure 4:
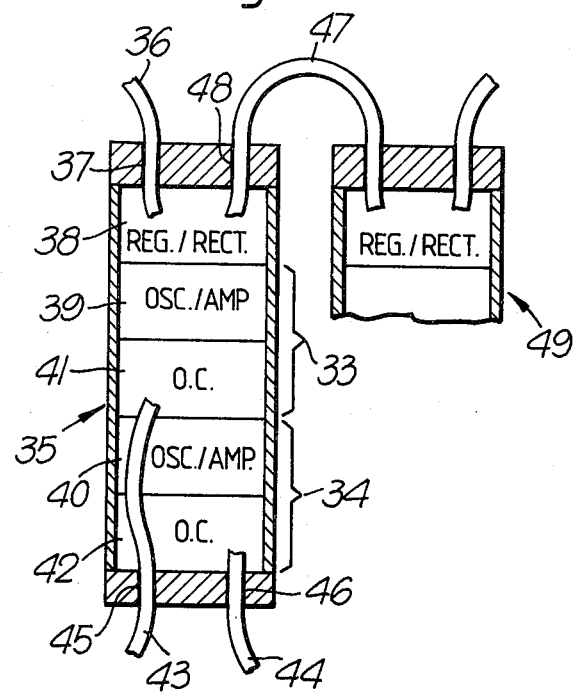
FIG. 4 is a schematic diagram of power supply units within a flameproof enclosure.

FIG. 4 is a schematic diagram of a pair of power supply units 33 and 34 housed within a flameproof enclosure 35. A 125 volt a.c. supply 36 is fed into the enclosure 35 through a flameproof bush 37 in known manner. The supply 36 is connected to a voltage regulator and rectifier unit 38 which feeds a regulated d.c. supply to each of the units 33 and 34.

The units 33 and 34 comprise oscillator/amplifier units 39 and 40, respectively, and output circuits 41 and 42, respectively. The outputs from the circuits 41 and 42 are fed out of the enclosure 35 on lines 43 and 44, which pass through flameproof bushes 45 and 46. The lines 43 and 44 feed respective batches of fluorescent lamps (not shown in FIG. 4) located at the coal face, and/or on the roadway, via respective series transformer circuits as described above.

Clearly, the units 33 and 34 could alternatively be mounted separately in their own flameproof enclosures, or more than two such units could be mounted in a common enclosure. Separate supplies from the 125 v lighting transformer could be taken to the separate enclosures, or an extension 47 of the supply 36 could be looped out of the enclosure 35 via a flameproof bush 48 and fed into another enclosure 49.

Since the transformers 3, 4 etc. of FIG. 1, and the corresponding transformers of FIG. 2, can be very small due to the high frequency operation, the transformers and the associated capacitors can be mounted in the light fitting or luminaire.

If it is a practical convenience to have easy removal of the lamp connection without interrupting the supply to the others in the group, then the primary and secondary transformer windings could, as mentioned above, be wound separately and contained in their own part of the core. Separation of the core parts will then enable the lamp to be disconnected and/or removed. In normal operation, removal of a lamp, as for instance in relamping, will not affect the function of the other lamps in the group, but disconnection of the primary circuit will, hence this facility could in some situations be advantageous.

Each lamp presents two types of load at separate times, firstly a high impedance before striking, followed by a relatively low resistance when the lamp has struck. These two conditions are transformed by the circuit into a low inductance and a lower value, mostly resistive, impedance, respectively.

Each transformer circuit can be designed to have no more energy than 1/n times the safe energy level for the system. Then any number up to n such transformer circuits connected in series will be a safe practical system.

The addition of further transformations over and above n will cause the supply zener diode 29 and resistor 30 circuit to conduct and the available energy will be divided between the loads, and the power supplied to each load will become less to the point where it is insufficient and the lamp will cease to operate. This feature of the design ensures that trying to feed too many loads does not result in a dangerous condition.

When the lamps are in the inductive state, the voltage across each transformer primary winding will be high, and consequently the secondary voltage will be high, thereby causing the lamp to strike. The lamp running current is then controlled, since it is in a predetermined relationship, governed by the transformer ratio, to the series supply current.

Such a system can be made to accommodate any type of cable, and at high frequencies a highly capacitive type of cable and a number of loads may be added in series on a two wire supply, without the added loads or sections of line affecting the individual outlets.

At these high frequencies the cable characteristics become a significant part of the total circuit and the lengths required in practice amount to transformers in themselves.

A system comprising merely transformer primary windings connected in series across the supply would be capable of running more lamps than it is capable of starting, and it can only be used for the lesser number of lamps. To overcome this, the series capacitors 6, 7, 8 - - - X are inserted which results in a reduction of the effective inductance of each circuit without affecting the primary current, and the combination of these reduced inductances and the line transformation allows more units to be supplied with enough starting voltage from a given supply.

When the lamps have struck, the series of primary loads approximate to an impedance which is near the impedance of the line. In this condition maximum power transfer is obtained, and the length of the line plays a minor role in the running performance of the system.

The value of each capacitor can be so chosen that each transformation has the primary inductance reduced in the starting condition, and cancelled or reversed in the running condition, so that the impedance then becomes resistive/capacitive and when offered to a given length of line becomes transformed to pure resistive at the supply point.

It will be clear that, since the transformer primary current is always maintained substantially constant except when reduced by the operation of the zener diode 29 in the overload condition, the disconnection of any of the loads from the system will not affect the voltage on the remaining loads. Furthermore, provided that the transformers are designed to provide the required load power in response to the constant current which is supplied to their primary windings, the various loads may be of different power ratings.

If an operator were to get into the situation of receiving an electric shock from a transformer secondary winding in the high-frequency fluorescent lamp circuits described above, such a shock could not normally be at a fatal current level because the voltage would drop if the current tries to increase.

I claim:

1. A power supply system for supplying electrical power to a plurality of fluorescent lamps in a potentially hazardous atmosphere, comprising a power supply which produces a substantially constant current output at a frequency in a range of about 1 kHz to about 500 kHz; a plurality of transformers each having a primary winding and a secondary winding; means to couple said primary windings of all of said transformers together in a series circuit; means to couple at least one respective fluorescent lamp across each said transformer secondary winding; voltage control means connected between said power supply and said series circuit to control the voltage level applied to said series circuit by said power supply to ensure that the amount of electrical energy supplied to said transformer primary windings by said power supply cannot be incendive to the atmosphere; and capacitance means coupled in said series circuit to reduce the reactance of said series circuit whereby an increased number of said lamps can be started for a given value of said applied voltage level.

2. A system as claimed in claim 1, wherein each said transformer includes means to supply current to at least one heater of the associated fluorescent lamp.

3. A system as claimed in claim 2, wherein each transformer is an auto-transformer.

4. A system as claimed in claim 1, wherein said secondary windings are readily separable from the respective primary windings for disconnection of the respective lamps.

5. A system as claimed in claim 1, wherein cores of said transformers are, at least in part, readily separable from the respective windings for disconnection of the respective lamps.

6. A system as claimed in claim 1, wherein said power supply comprises an oscillator and a tuned circuit connected to the output of said oscillator; and wherein said tuned circuit maintains said current output substantially constant.

7. A system as claimed in claim 1, wherein said power supply and said voltage control means are mounted within a flameproof enclosure.

8. A system as claimed in claim 7, wherein said flameproof enclosure is an enclosure of a transformer which energizes said power supply.

9. A system as claimed in claim 1, wherein said voltage control means comprises a zener diode and resistance means connected in series across said power supply.

* * * * *